US012621255B2

(12) United States Patent　　(10) Patent No.:　US 12,621,255 B2

Macleod　　(45) Date of Patent:　May 5, 2026

(54) SCALABLE UTILIZATION OF ENCRYPTED PLATFORM DEVICE CONNECTION FOR LEGAL INTERCEPT OF MESSAGING DATA

(71) Applicant: DISTILX LTD., Kirkwall (GB)

(72) Inventor: Finn Macleod, Kirkwall (GB)

(73) Assignee: DISTILX LTD., Kirkwall (GB)

( * ) Notice: Subject to any disclaimer, the term of this patent is extended or adjusted under 35 U.S.C. 154(b) by 177 days.

(21) Appl. No.: 18/591,275

(22) Filed: Feb. 29, 2024

(65) Prior Publication Data

US 2025/0279975 A1　　Sep. 4, 2025

(51) Int. Cl.
H04L 51/066　　(2022.01)
H04L 9/40　　(2022.01)

(52) U.S. Cl.
CPC ............ H04L 51/066 (2013.01); H04L 63/30 (2013.01)

(58) Field of Classification Search
CPC ... H04L 51/066; H04L 63/30; H04L 63/0428; H04L 63/062; H04L 63/306; H04L 63/308; H04W 12/80
See application file for complete search history.

(56) References Cited

U.S. PATENT DOCUMENTS 8,041,022 B1 * 10/2011 Andreasen .............. H04L 47/10
709/224
2006/0217136 A1 * 9/2006 Bantukul .............. H04W 12/80
455/414.1

2007/0111704 A1 * 5/2007 Linkert ................. H04W 24/00
455/466
2010/0250498 A1 * 9/2010 Andersen .............. G06Q 10/10
714/48
2012/0089747 A1 * 4/2012 Attanasio ............... H04L 63/30
709/246
2012/0158955 A1 * 6/2012 Kim ........................ H04L 63/30
709/224
2018/0232411 A1 * 8/2018 Cohan .................... H04M 1/66

FOREIGN PATENT DOCUMENTS

WO　　2020/225258 A　　11/2020

OTHER PUBLICATIONS

GB Combined Search and Examination Report dated Aug. 14, 2025 from corresponding GB Patent Application No. 2501560.3, 10 pages.

* cited by examiner

*Primary Examiner* — Johnny B Aguiar
(74) *Attorney, Agent, or Firm* — Ruggiero McAllister & McMahon LLC

(57)　　ABSTRACT

A system for intercepting and storing data transmitted between a device(s) and a messaging platform(s), the system including an intercept server such that when data is transmitted from the messaging platform(s) to the device(s), the data is also transmitted to the intercept server, the system automatically identifying the data and modifying/formatting the data to be normalized data, which is then accessible by an analyst computer.

20 Claims, 9 Drawing Sheets

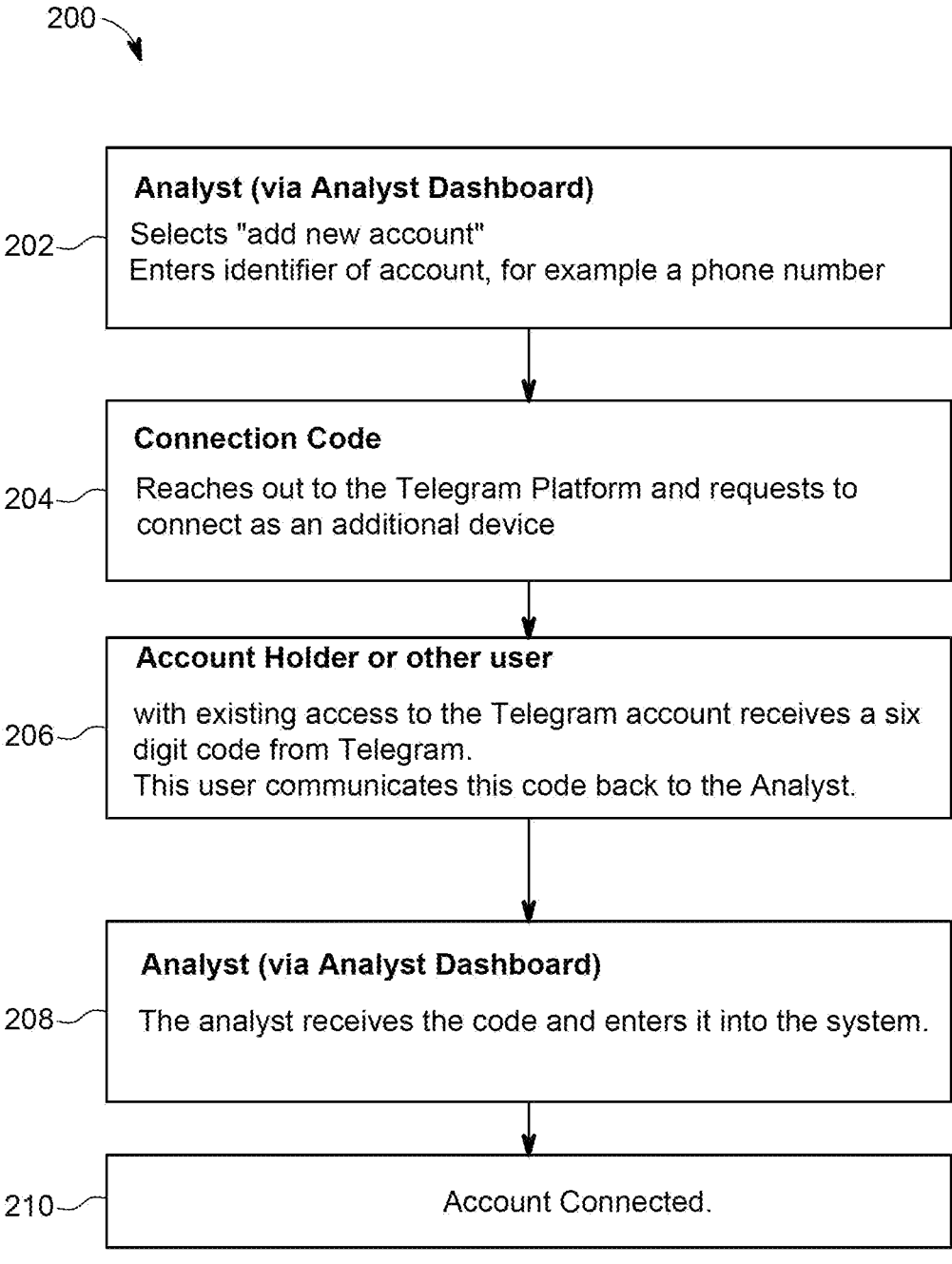

200

202 — Analyst (via Analyst Dashboard)
Selects "add new account"
Enters identifier of account, for example a phone number 204 — Connection Code
Reaches out to the Telegram Platform and requests to connect as an additional device 206 — Account Holder or other user
with existing access to the Telegram account receives a six digit code from Telegram.
This user communicates this code back to the Analyst.

208 — Analyst (via Analyst Dashboard)
The analyst receives the code and enters it into the system.

210 — Account Connected.

FIG. 4A

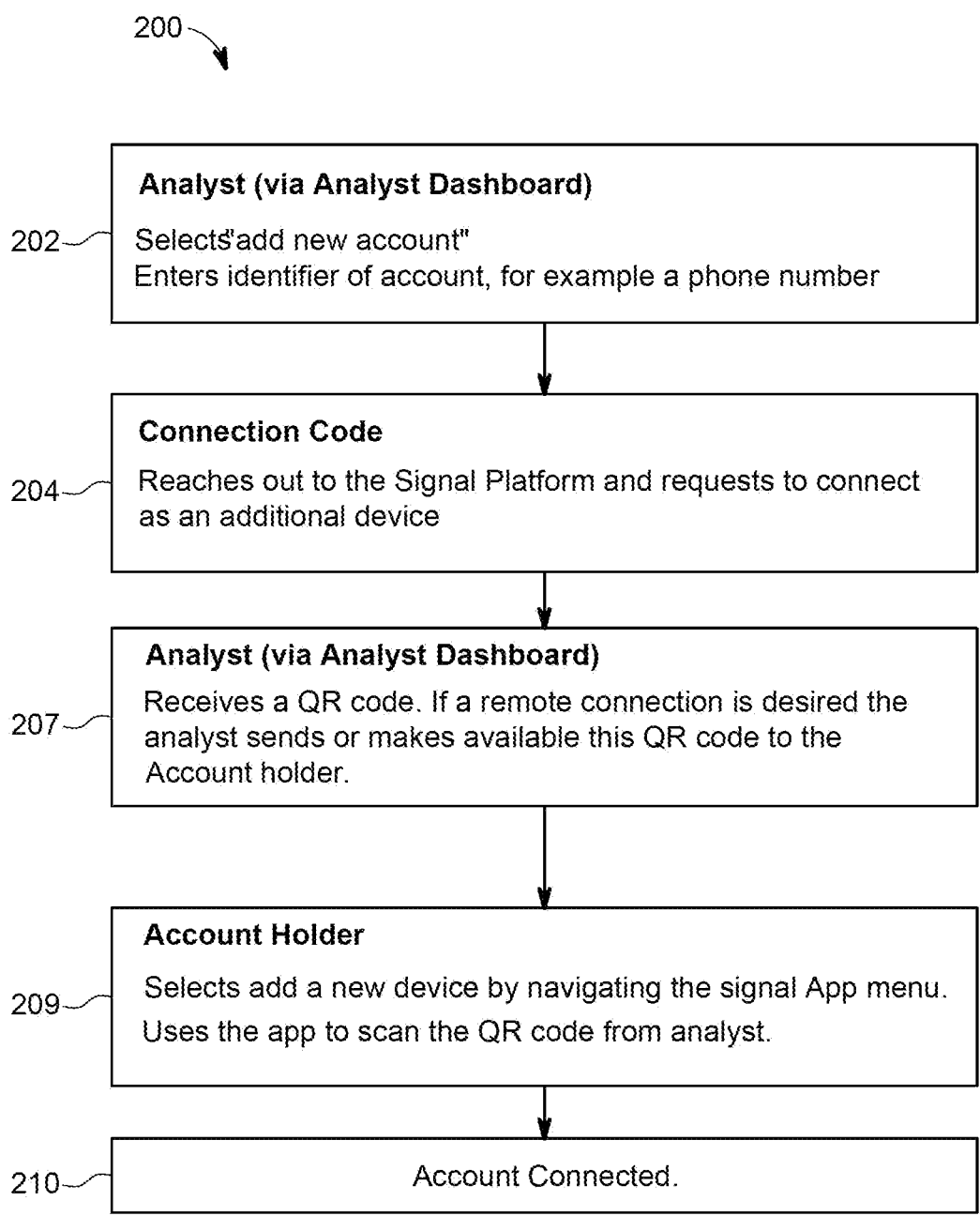

200

Analyst (via Analyst Dashboard)

202

Selects "add new account"
Enters identifier of account, for example a phone number

Connection Code

204

Reaches out to the Signal Platform and requests to connect as an additional device

Analyst (via Analyst Dashboard)

207

Receives a QR code. If a remote connection is desired the analyst sends or makes available this QR code to the Account holder.

Account Holder

209

Selects add a new device by navigating the signal App menu. Uses the app to scan the QR code from analyst.

210

Account Connected.

FIG. 4B

SCALABLE UTILIZATION OF ENCRYPTED PLATFORM DEVICE CONNECTION FOR LEGAL INTERCEPT OF MESSAGING DATA

BACKGROUND

1. Field of the Invention

This application relates to Legal Intercept for Intelligence, Military and Law Enforcement. More particularly, the present disclosure is related to a system for intercepting and storing data transmitted between a device(s) and a messaging platform(s) and automatically modifying/formatting the data for access by an analyst computer.

2. Description of Related Art

In the field of legal intercept, intelligence and law enforcement agencies spend significant resources to secure intelligence from mobile and computing devices.

The growth of encrypted messaging applications such as Whatsapp®, Telegram® and Signal®, however, prevents intelligence & law enforcement agencies from accessing data and information. Companies continually work to "crack phones" with various technologies and methods to gain access to previously secure data. These companies often have large research teams continually trying to find new ways to circumvent phone security. Additionally, hackers who discover new ways to access data in mobile devices and computers can sell this information for large sums of money. However, an exploit, once it has become known by the mobile device manufacturer, is typically patched quickly and the ability to access data based on that method is removed. Hence there is a continual arms race between mobile device manufacturers (who want security) and companies that sell tools to access these phones (legal intercept).

This industry has significant value, for example Cellebrite, a publicly listed company who develops and sells a phone cracking tool used by many national police forces had a valuation of several billion dollars (as of 2020). However, the valuation of this type of company is at constant risk of being lost if their exploits become patched and they cannot discover new methods of obtaining access to secure devices.

One use case in law enforcement is in child protection, where the messaging accounts (such as Telegram®, Signal®, WhatsApp®, etc.) of arrested child abusers are often taken over by authorities to discover and apprehend additional abusers. This mobile device might be cracked using a tool as described above or may be accessed via a negotiated consent. Once the phone is opened, an undercover government agent can assume the identity linked with the phone account to obtain evidence against additional offenders. An agent involved with this type of work may be responsible for working several phones simultaneously. This can require significant effort such as scrolling through menus on each phone, maintaining logs of what is said on each device, and even mobile device maintenance (e.g., keeping all the mobile devices charged, with sufficient credit, and so on). A typical agent may be monitoring and caring for hundreds of mobile devices, all with their own chargers, names, and numbers, often stuck to them with sticky notes.

It is required by law that diligent records are kept of communications between an agent and a suspect. In undercover police or intelligence work, this includes interactions with sources or informants. However, with modern mobile platforms this is not a straightforward task. For example, communications platforms often have a "disappearing messages" feature. Suppose a suspect sends a message to a source's mobile device where the "disappearing message" feature is set to delete the message 1 minute after being read. To document this, it has been the case that an source must very quickly grab an additional phone and take a picture of the message, or read it, memorize it and take notes immediately thereafter. The source then forwards that information to the agent who logs it as evidence. This process is disadvantageous for the following reasons:

1) The process is time consuming. Manually logging information takes a lot of time as does the process of sending that manually logged information to an agent.
2) Relying on a source to record and send each message is fallible-information may be omitted, both unintentionally and intentionally. Some communications may not be sent to the agent by the source, or only portions of the communication may be manually logged and forwarded.
3) Remembered or contemporaneous notes may be fallible and can be questioned, for example, by the defense in court proceedings. Inserting a source directly into the chain of custody of evidence raises problems, as does having to directly rely on the memory and the reliability of the source.
4) A mix of images, notes and video is unstructured and difficult to work with. It requires additional work by the agent or other members of staff to transcribe the source's information into text or into other databases to make it searchable and usable.
5) Dangers to the source. A source will need a safe time and place to record this information and if they have an additional phone, they need to keep this safe. Likewise, if a source meets with an agent(s), these meetings must be discreet.

Furthermore, old legal intercept techniques do not work on modern communication platforms (such as Telegram®, Signal® and WhatsApp®) due to widespread use of encryption. The use of these modern communication platforms continues to expand. One of the challenges with receiving data from multiple communication platforms is that the data may be provided in diverse formats. For example, data collected from Signal® may comprise a different format than data collected from WhatsApp®, even if the data is a similar type of data (e.g., contacts, video clips, or written messages and so on). Categorizing and logging this data can be time-consuming.

A traditional approach to addressing the problems previously discussed has been to look for security "hacks", which involves directly breaching the cryptography of a mobile device. However, it is contemplated that a lateral approach could deliver significant benefits.

Accordingly, there is a need for mobile device connection system that overcomes, alleviates, and/or mitigates one or more of the aforementioned and other deleterious effects of prior art.

SUMMARY

Accordingly, what is needed is a system and method for managing the connection of and automatically saving data associated with a mobile device.

It is further desired to provide a system and method for managing the connection of and automatically organizing data associated with a mobile device.

It is still further desired to provide a system and method for managing the connection of and automatically organizing data associated with a plurality of devices.

It is also desired to provide a system and method for managing the connection of and automatically organizing data associated with a plurality of accounts, each account having an associated device(s).

It is yet further desired to provide a system and method for managing the connection of a device and automatically normalizing data received from a plurality of messaging platforms.

Modern messaging platforms such as WhatsApp®, Telegram® and Signal® are provided with the option to connect multiple devices, such as a laptop, a mobile phone, a computer, a tablet, and so on, to a single messaging account. This feature can be exploited to define a system that provides quick connection and is remotely to scalable for many platform accounts facilitating the continuous collection of reliable information.

In one configuration, a device (e.g., a mobile phone) connects to a messaging service server, which allows the device to send and receive messages from other devices connected to the messaging service server. An intercept server is provided that is coupled to the messaging service server via connection software, which allows the intercept server to connect into a specific account associated with the device. The intercept server will automatically gather data associated with the device based on a set of instructions. An analyst computer is, in turn, coupled to the intercept server and includes software for receiving the data received from the device. A storage accessible by intercept server (or the analyst computer) is used to store the data captured and forwarded by the intercept server to the analyst computer. Software executing on the intercept server (or the analyst computer) can automatically identify and normalize the data, which is then saved on the storage in a database based on rules defined by the software.

This system configuration can provide significant time savings. For example, it is estimated that child protection agents could save an estimated 80 hours per month, in addition to obviating serious problems relating to chain of custody issues for evidence along and increasing the reliability of the completeness of the data captured.

The data that is automatically captured could include a wide range of information including but not limited to, text messages, audio notes, images, and videos sent to and from an account as well as contacts, usernames, groups that the account has joined, and activity times associated with the account. The exact list of available data that is available to be captured depends on the messaging platform. In one application, disappearing messages are also automatically recorded and normalized by the system providing a highly reliable method of securing this type of transient data. In other words, any data that is deleted from the device will remain saved on the storage that is accessible by the analyst computer for retrieval by agents.

One of the challenges the above system faces is that data may be collected on multiple accounts each connected to different messaging platforms such as WhatsApp®, Telegram® and Signal®. There could be similar data collected from each of these messaging platforms (e.g., contacts or location information) however, the data may be provided in different formats. For the system to normalize the data, it must be correctly identified, then it must be converted into a format the system uses for that type of data, then it must be saved in a database in a manner that it is easily searchable and identified. Normalization can occur via a look up table that enables the system to identify the type of data that has been received. Additionally, the system can automatically convert the data into a format that is easily used by the system. For example, the system may receive location data from WhatsApp in a first file format relating to a first user account. The system may further receive location data from Signal® in a second file format relating to a second user account. The system can use a look up table to automatically identify the first and second file formats, and then automatically convert the data into a third file format that is usable by the system.

Once the data is identified and normalized, the data is indexed, which allows for easy searching and retrieval. In one configuration, this feature allows for a single search to be performed across data associated with multiple connected accounts, from one or multiple messaging platforms.

Additionally, the safety of a source is protected by reducing the need for face to face meetings, or the need for the source to log information, photographs or video messages as evidence or keep notes including disappearing messages.

This "lateral" approach does not rely on hacking the phone. Rather, this relies on consensual access to the device by the owner. As such, the system cannot be prevented from use by mobile device companies updating hardware configurations as it intercepts communication at the app level. Developers of encrypted applications have a choice-removing the multi device functionality, which is a piece of functionality that is popular with users, or they can restrict the multi device functionality. Even in situations where the multi-device functionality is restricted on the encrypted messaging platform, a simple relay system can be implemented to allow the system to maintain access. Thus, the system is a much more robust method for maintaining information flows than relying exclusively on hacked hardware or software.

While this lateral approach does not eliminate the need to hack devices, it does significantly lower the need for that type of approach as once a device has been intercepted, data coming to that device from other devices can be captured and the owners of those devices can be communicated with to provide consensual access to their devices. This can lead to a significant reduction in reliance on device hacking to gather data and information. The system facilitates a middle ground of rank and file policing—between one extreme (the approach of mass surveillance), and on the other (law enforcement having no automated way at all to extract information from encrypted networks), by delivering intelligence and connection to many source accounts.

For this application the following terms and definitions shall apply:

The term "data" as used herein means any indicia, signals, marks, symbols, domains, symbol sets, representations, and any other physical form or forms representing information, whether permanent or temporary, whether visible, audible, acoustic, electric, magnetic, electromagnetic or otherwise manifested. The term "data" as used to represent predetermined information in one physical form shall be deemed to encompass any and all representations of the same predetermined information in a different physical form or forms.

The term "network" as used herein includes both networks and internetworks of all kinds, including the Internet, and is not limited to any particular type of network or inter-network.

The terms "first" and "second" are used to distinguish one element, set, data, object or thing from another, and are not used to designate relative position or arrangement in time.

The terms "coupled", "coupled to", "coupled with", "connected", "connected to", and "connected with" as used herein each mean a relationship between or among two or more devices, apparatus, files, programs, applications, media, components, networks, systems, subsystems, and/or means, constituting any one or more of (a) a connection, whether direct or through one or more other devices, apparatus, files, programs, applications, media, components, networks, systems, subsystems, or means, (b) a communications relationship, whether direct or through one or more other devices, apparatus, files, programs, applications, media, components, networks, systems, subsystems, or means, and/or (c) a functional relationship in which the operation of any one or more devices, apparatus, files, programs, applications, media, components, networks, systems, subsystems, or means depends, in whole or in part, on the operation of any one or more others thereof.

The term "automatic" and variations thereof, as used herein, refers to any process or operation done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material."

As used herein, the phrases "at least one," "one or more," "or," and "and/or" are open-ended expressions that are both conjunctive and disjunctive in operation. For example, each of the expressions "at least one of A, B and C," "at least one of A, B, or C," "one or more of A, B, and C," "one or more of A, B, or C," "A, B, and/or C," and "A, B, or C" means A alone, B alone, C alone, A and B together, A and C together, B and C together, or A, B and C together.

In one configuration a system for managing information transmitted to one or more devices and automatically normalizing data received from a plurality of messaging platforms is provided, the system comprising: an intercept server having a storage and having software executing thereon including: a normalization and indexing module, a connection module, and a dashboard module. The system is provided such that the intercept server is coupled to an analyst computer via a network connection, and the intercept server is coupled to a messaging platform server via the network connection, the messaging platform using a messaging platform data format for communicating data. The system is further provided such that when data is transmitted from the messaging platform to the one or more devices, the data is simultaneously transmitted to the intercept server, and the connection module receives the data transmitted from the messaging platform in the messaging platform data format. The system is still further provided such that the normalization and indexing module automatically identify the received data and modify the received data to be in a system data format, which is saved on the storage, where the system data format is different than the messaging platform data format. Finally, the system is provided such that the dashboard module receives a request from the analyst computer to access the saved data, and the intercept computer transmits the data to the analyst computer.

The above-described and other features and advantages of the present disclosure will be appreciated and understood by those skilled in the art from the following detailed description, drawings, and appended claims.

DESCRIPTION OF THE DRAWINGS

FIG. 4A a process flow diagram illustrating one process for connecting an additional account on the Telegram® messaging platform according to the system of FIG. 1.

FIG. 4B a process flow diagram illustrating one process for connecting an additional account on the Signal® messaging platform according to the system of FIG. 1.

DETAILED DESCRIPTION

Figure 1:
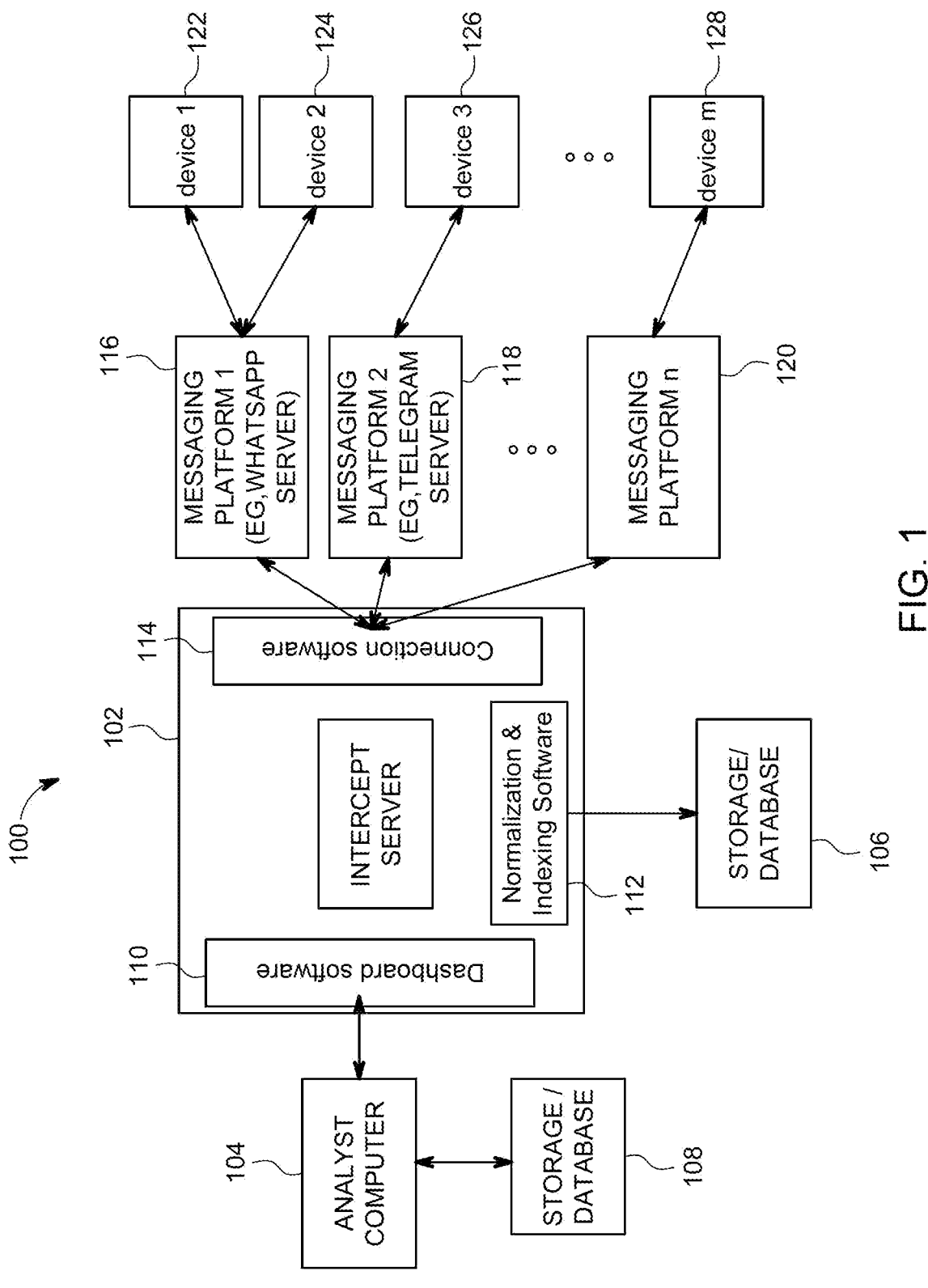
FIG. 1 is a block diagram of the system for managing connection to a device and the automatic gathering and organizing of data captured from the device connected through a messaging platform.

Referring to the drawings and in particular to FIG. 1, system 100 for capturing and normalizing data from a plurality of devices is illustrated. System 100 includes an intercept server 102 coupled to an analyst computer 104. The intercept server includes storage/database 106 accessible thereto. It should be noted that analyst computer 104 may have the storage/database 106 coupled directly thereto or may have a second storage/database 108.

The intercept server 102 may be provided with dashboard software 110 (alternatively the dashboard software 110 could reside on and execute on the analyst computer 104) that functions to facilitate communication between the intercept server 102 and the analyst computer 104. Also provided on intercept server 102 is normalization and indexing software 112 as well as connection software 114. Connection software 114 allows the intercept server 102 to connect to a plurality of messaging platforms 116, 118, 120. The messaging platforms may be generically listed as MP1 116, MP2 118, and MP3 120. However, in this example, the messaging platforms listed are associated with MP1 (WhatsApp®), MP2 (Telegram®), and MP3 (Signal®). However, it should be noted that fewer, more, or other messaging platforms may be utilized. In the example illustrated in FIG. 1, device1 122, and device2 124 are connected to MP1 116, device3 126 is connected to MP2 118, and device4 128 is connected to MP3 120. The devices may comprise any type of device that can send and receive data from a messaging platform including, for example but not limited to, a mobile phone, a tablet, a laptop computer, a desktop computer and so on. Additionally, an account holder may have one device connected to a messaging platform as illustrated with MP2 118 and MP3

120 or may have multiple devices connected on a single account as illustrated in MP1 116.

In one configuration, the analyst computer 104 may send and receive requests to and from the intercept server 102 via standard web browser 130. The intercept server 102 may respond to these requests using the dashboard software 110. As previously described, the intercept server 102 may be connected to n different messaging platforms via the connection software 114. In turn these messaging platforms communicate with a diverse group of devices.

The various elements of FIG. 1 will be described in greater detail in the following FIGS. 2-6

Figure 2A:
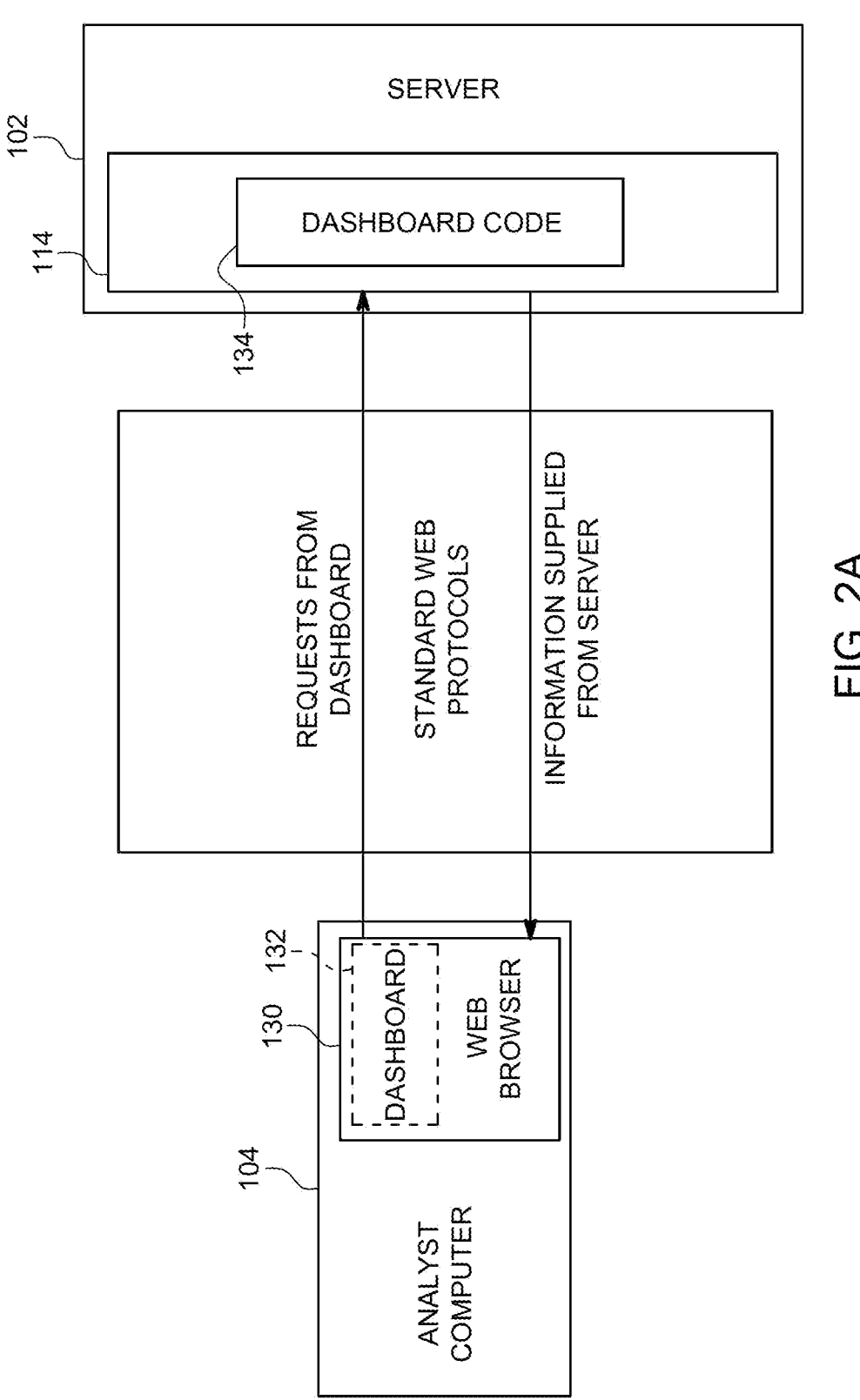
FIG. 2A is a block diagram illustrating the communication between the intercept server and the analyst computer according to the system of FIG. 1.

FIG. 2A illustrates the connection between the analyst computer 104 and the intercept server 102. In this configuration, the analyst computer 104 runs a standard web browser (e.g., Chrome, Firefox, etc.) to display a dashboard 132 to an analyst/agent. The analyst/agent may use the dashboard 132 to make requests and view information saved by the intercept server 102. These requests are sent via standard web protocols to the intercept server 102, which is running dashboard software 110 that includes server side dashboard code 134. The dashboard code 134 sends the requested information to the analyst computer 104. In some instances, information is pushed directly from the server side dashboard code 134 to the analyst dashboard 132 without an analyst/agent request, (e.g., for alerts or other critical information).

The analyst dashboard 132 is a piece of software that is built with a typical framework for building interactive dashboards such as React. Methods of building these front end dashboards are well known. The analyst dashboard 132 allows the analyst/agent to examine individual accounts (e.g., a mobile device screen, FIG. 2B) or search across an entire database (the search screen, FIG. 2C). The dashboard 132 receives the input from the analyst, sends one or more requests to the server side dashboard software 114, which initiates searches on the storage/database 106, and receives information from the intercept server 102, which is displayed on the analyst dashboard 132.

In addition, the dashboard code 134 can initiate a new account connection (the start of FIG. 4A or FIG. 4B) and may contain event listeners that receive push notifications from the storage/database 106 for events such as new messages to a device that is being monitored. The analyst dashboard 132 is designed to facilitate easy querying of storage/database 106.

Figure 2B:
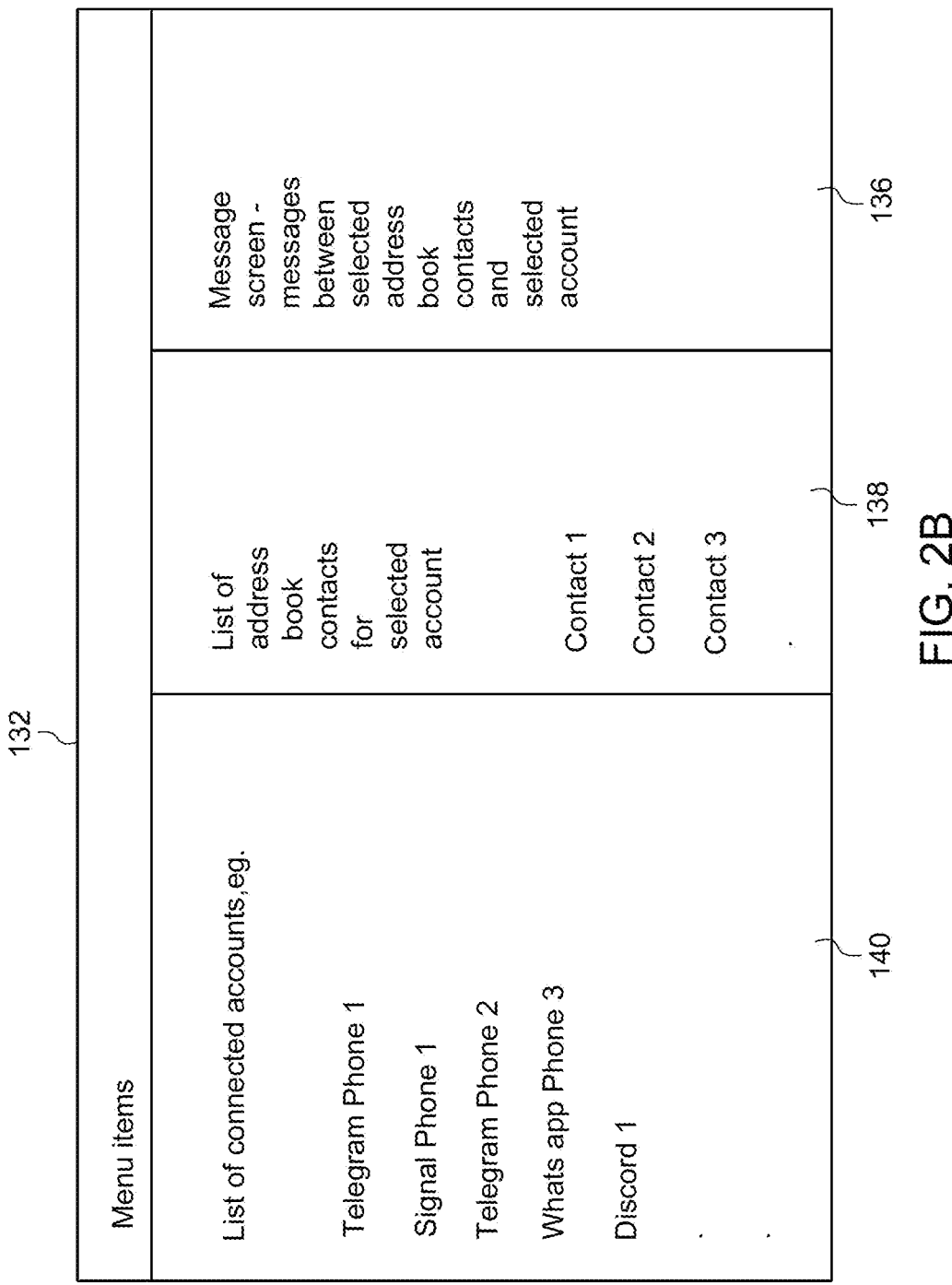
FIG. 2B is a screen shot of the dashboard on the analyst computer showing data organized according to a set of rules relating to one or more accounts associated with various devices according to the system of FIG. 1.

FIG. 2B illustrates a configuration of system 100 showing analyst dashboard 132 in greater detail. In this configuration, a phone screen is depicted, which allows the analyst to easily examine multiple messaging accounts from multiple mobile devices. The analyst can select a connected account from a list in, for example, the right hand column 136, then select contacts from that account in the middle column 138 and interact with the messages of a selected contact in the leftmost column 140. In one system configuration, the left most panel could be provided to appear like a messaging screen of a typical messaging platform app.

Figure 2C:
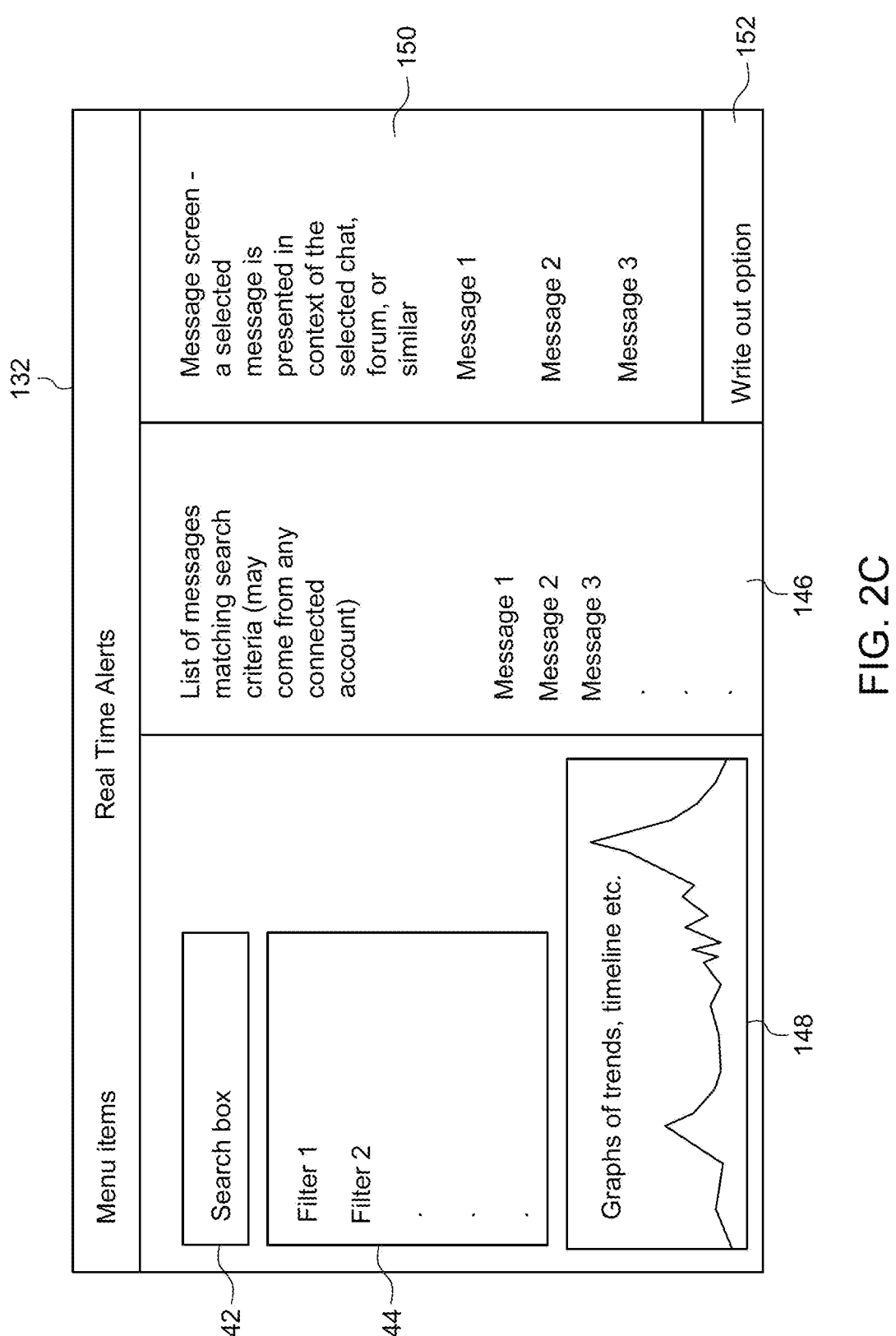
FIG. 2C is a screen shot of a search screen of the dashboard on the analyst computer showing data presented according to a set of rules relating to one or more accounts associated with various devices depicting the ability to search through all collected data across accounts simultaneously according to the system of FIG. 1.

FIG. 2C illustrates another configuration of system 100 showing analyst dashboard 132 in greater detail. In this configuration, a search screen is depicted, which allows the analyst the ability to search through all collected data across different accounts simultaneously. This data could include, for example, text messages, audio notes, images and videos sent to and from each account. It could further include other data such as account contacts, usernames, groups that an account has joined or activity times can be searched using the search box 142—typically all messages matching a keyword, or specific regular expression.

In searching the data, an analyst/agent may employ one or more filters 144, which could include filtering by account name, or by a group that an account has joined and so on. The analyst dashboard 132 will display all the messages by an account in the selected group that match the keyword. Likewise, graph 148 may display the activity (e.g., the number of matching messages) corresponding to this search over time. The filters 144 can be related to any category of data stored by the database. The middle column 146 shows all messages matching the search and filters. The right column 150 provides context to any selected message; showing the group it appears in, and messages that have been sent before and after. Also provided in this dashboard configuration is write out option 152, which is provided to allow the analyst/agent to directly write to a selected group.

Figure 3:
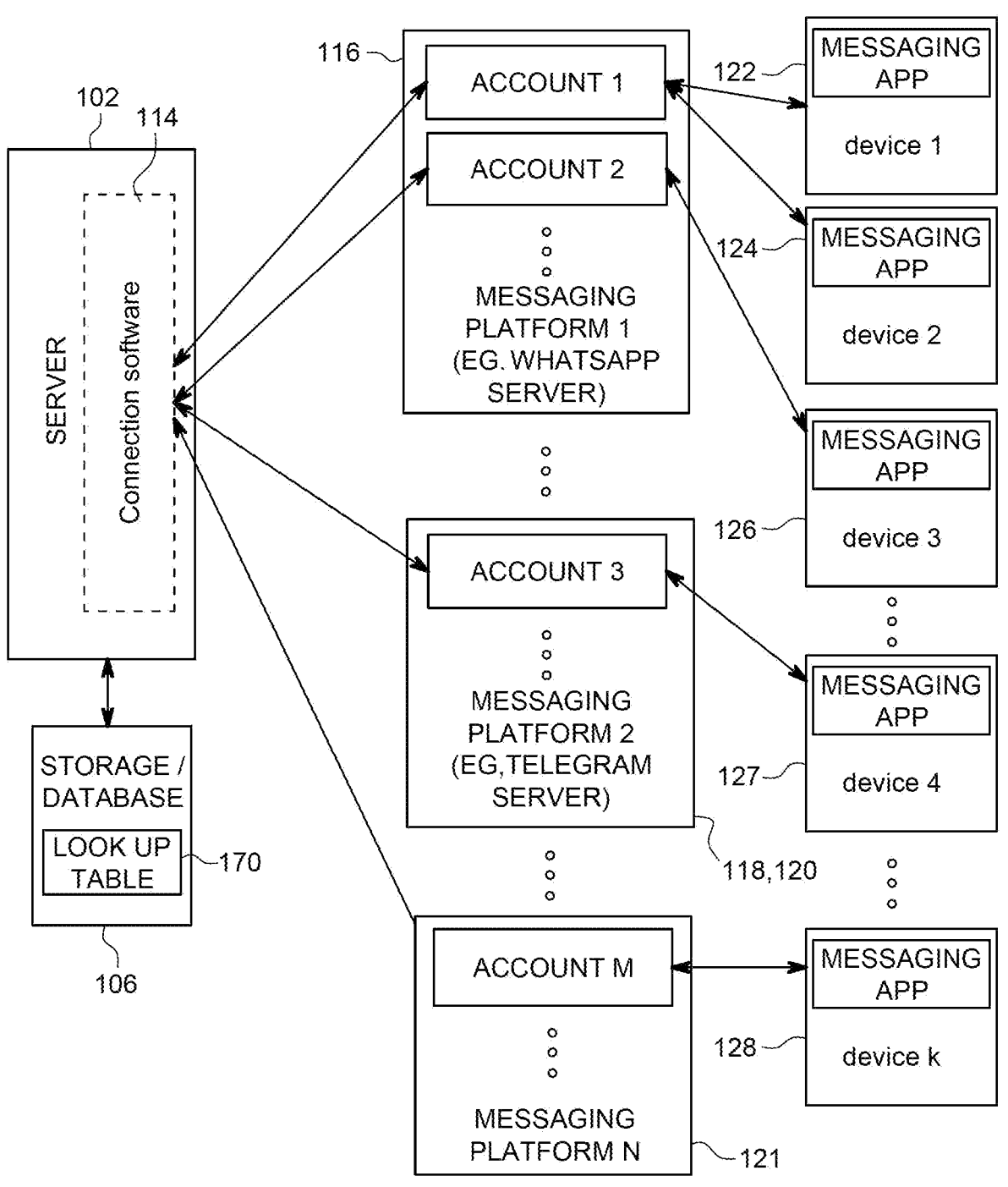
FIG. 3 is a block diagram of the connection between the intercept server and various messaging platforms according to the system of FIG. 1.

FIG. 3 provides an expanded view of the connection software 114. Connection software 114 communicates with multiple messaging platforms 116, 118, 120 separately for each account of interest. The process to establish a connection with a specific account on a messaging platform is outlined in greater detail in FIGS. 4A & 4B. Once the connection software has connected to a messaging platform and been appropriately authenticated, the connection software 114 exchanges data from a given account using the specific protocol of the given messaging platform. It should be noted that the same messaging account can be accessed by multiple devices, typically a mobile phone such as a smart phone, but could also be a laptop computer or any other device capable of running the messaging app software.

Data is retrieved from connected messaging accounts by connection software 114. The retrieved data can be diverse, but could include for example, text messages, contact lists, images, audio notes and video pertaining to connected accounts. It may further include activity data and metadata associated with those accounts. Each platform stores information in a slightly different format, and sometimes different types of information. As such, the system needs to normalize the data that it receives from a specific messaging platform. This can be achieved by means of a look up table that may be saved on storage/database 106. Likewise, the data that is sent to a specific platform must be adjusted to match the format of that platform. This can also be achieved by using the look up table in storage/database 106. Accordingly, even though system 100 is connected to different messaging platforms 116, 118, 120 each having their own format, system 100 can automatically adjust incoming data and outgoing data formats as needed for seamless operation.

Typical messaging platforms have the option to connect more than one device to a given account. A typical use case might be to connect a mobile device and a computer to the same account, to allow a user to access the same messages on both devices. Connection software 114 makes use of this functionality, to connect in the same way as any new device would request to be associated with an account. This allows the intercept server 102 to receive any new data coming to an account like it is just another device associated with the account.

As discussed, the intercept server 102 may connect to an account like another device. FIGS. 4A and 4B provide examples of the connection process to messaging platforms. FIG. 4A is an example of the process of connecting an additional account to the Telegram® messaging platform. FIG. 4B is an example of the process of connecting an additional account to the Signal® messaging platform.

A process 200 for connecting to the Telegram® platform (FIG. 4A) is discussed first. An analyst/agent may request a connection to a new account by entering the desired phone number into the dashboard software, along with a desired messaging platform 202. This triggers the connection software 114 to perform a connection that is identical (e.g., the system mimics an additional device) to a laptop or additional mobile device connecting to an existing messaging platform account 204. In some instances, a code is returned to the owner of the account on a hardware device that is already connected 206. This code is transmitted to the analyst dashboard 132 (e.g., by a phone call or a screenshot). Once the analyst/agent enters the code, the connection software 114 sends the code to the messaging platform server for authorization 208. The messaging platform then authenticates the code and the system 100 is connected 210.

The process 200 of connecting to a messaging platform such as Signal is depicted in FIG. 4B. The process is similar to that illustrated in FIG. 4A, however, Signal® differs in that it uses a Quick Response (QR) code. For example, after the step of reaching out to connect a new device 204, the analyst/agent will receive a QR code 207. If a remote connection is desired, the analyst/agent sends or makes available the QR code to the Account holder. The Account holder then selects to add a new device by navigating the Signal® App menu and uses the app to scan the QR code 209. The messaging platform then authenticates the code and the system 100 is connected 210.

The process of connecting a device to a messaging platform is specific to each messaging platform and is generally detailed in open access, online documentation provided by the messaging platform. Some platforms (e.g., Telegram®) have third party code libraries designed for software developers (such as Telethon®), which makes the process even simpler. The connection code contains unique modules each of which contain the specific protocols for connecting to each messaging platform. More specifically:

1) the connection software 114 supplies account details (e.g., a phone number) and a receiving device Identifier (ID) to the messaging platform (i.e., this is the address to which the messaging platform server will send messages, in this case, an address of the system).

2) Authorization keys are exchanged between the messaging platform and the connection software 114 to enable end to end encrypted communication. The exact form of encryption may depend on the messaging platform.

3) Once the connection is complete, the connection software 114 activates event listeners to receive any messages sent by the messaging platform-in the same way as a more traditional messaging app may function on a mobile phone handset.

Figure 5:
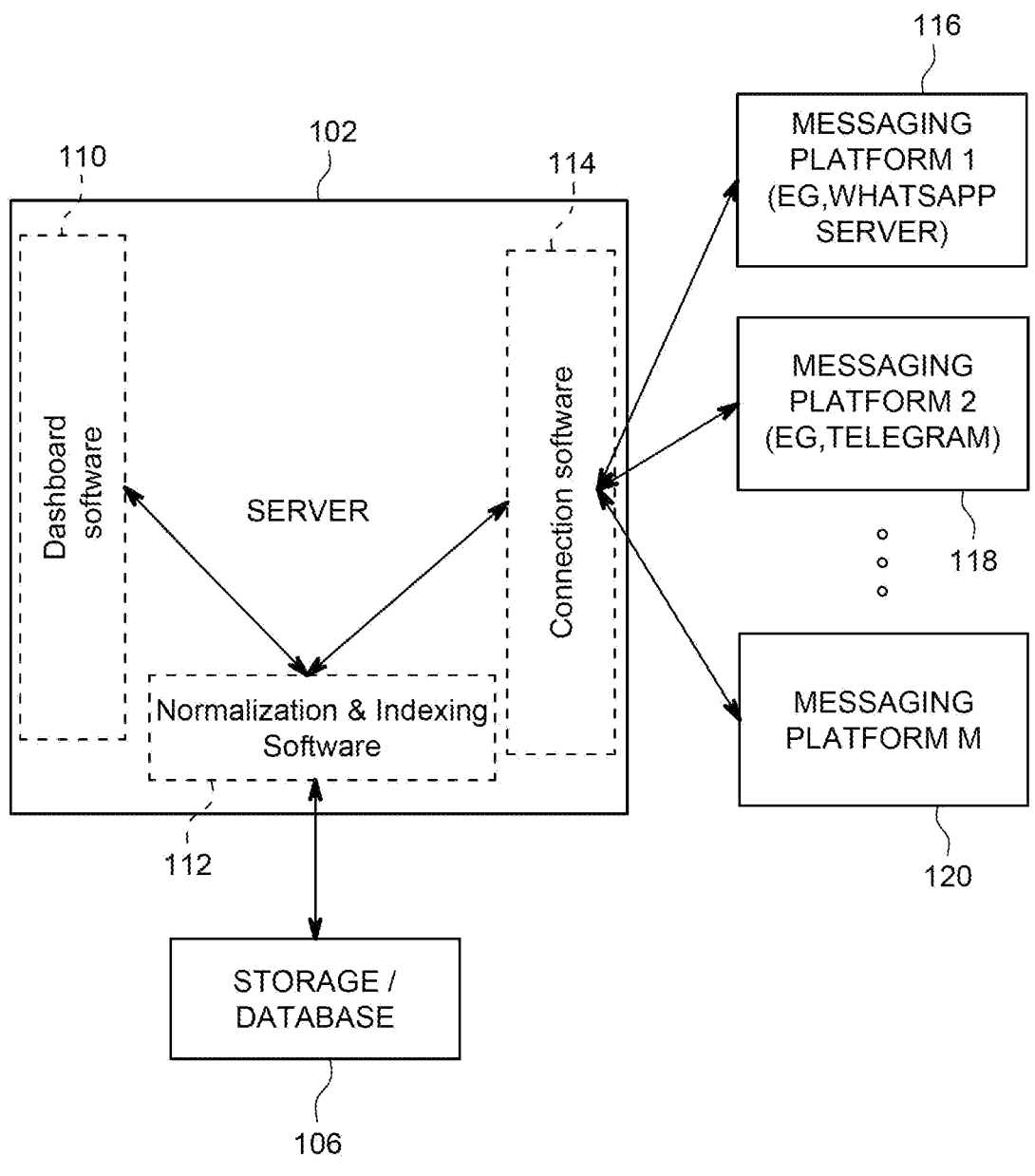
FIG. 5 is a block diagram of the intercept server illustrating the interaction between the dashboard software, the connection software, and the normalization, indexing and retrieval software according to the system of FIG. 1.

Messages may now be exchanged between mobile handset, system 100 and a third party as shown in FIG. 5. The connection between the connection software 114 and the messaging platform persists until deleted by a request from the analyst dashboard 132, or reset by the messaging platform, for example, in the event of a messaging platform software update.

FIG. 5 discusses the normalization and indexing software 112 in greater detail. The normalization and indexing software 112 receives information from the connection software 114. This data comes in different formats depending on which messaging platform the information originates from. However, the content of this information contains similar core data, for example, text from text message data, time stamps corresponding to when a message was sent, image data, and so on. The normalization and indexing software 112 reformats all incoming data into a format that is usable by system 100 with an additional column that labels the originating message platform. Normalization and indexing software 112 is able to identify the incoming data by means of a look up table, which is used to identify the type of data that is incoming and facilitates the automatic conversion to a usable format. Normalization and indexing software 112 then transmits the formatted data to the storage/database 106 to make it available for later search and retrieval.

Storage/database 106 is a repository for both the metadata (e.g., device ID, authorization keys etc.) and the messaging data (e.g., contacts, messages, sent images) for multiple mobile devices and messaging accounts.

Storage/database 106 further comprises tables, which contain account and authorization data for many account connections as described above and shown FIGS. 1 and 3. For each connection the connection software 114 provides the "device ID", authorization keys and other metadata associated with the account to the normalization and indexing software 112, which stores this information in storage/database 106.

The storage of data is handled by a database designed to handle data at scale. In one configuration, an open-source relational database management system (RDBMS) that uses Structured Query Language (SQL) to store, manage, and retrieve data is used, such as MySQL. However, it will be understood that columnar databases may be used for faster access. The system may advantageously be run on standard computer hardware with, for example, a Linux operating system.

Figure 6:
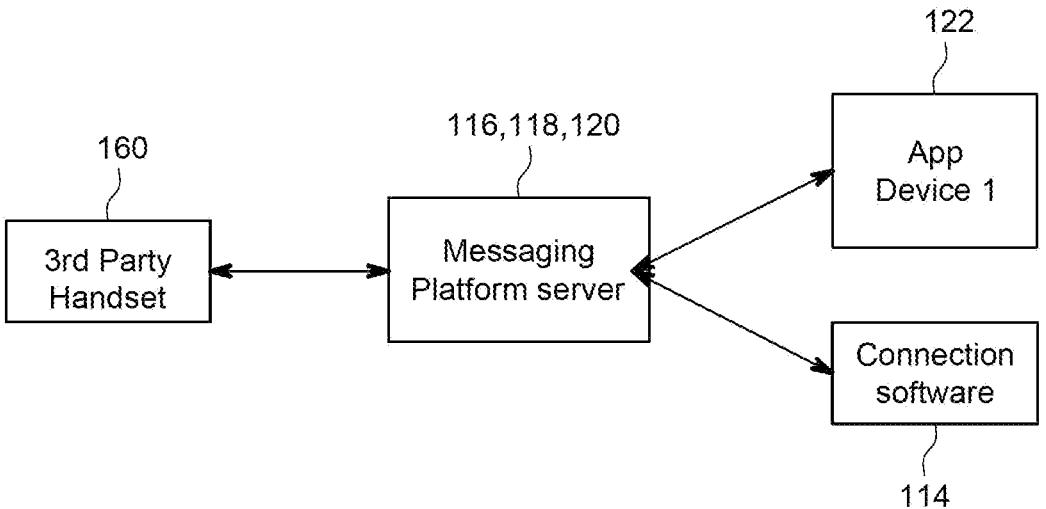
FIG. 6 is a block diagram illustrating information flow from a third party device sent to the device, which is automatically and simultaneously copied via the connection software to the intercept server according to the system of FIG. 1.

Turning now to FIG. 6, the information flow through system 100 is discussed. Here, a third party device 160 sends a message to a connected account. This message is received by the messaging platform server 116, 118, 120, which is then split and sent simultaneously to all connected devices associated with that account. In this way, the connection software mimics the behavior of an additional device connection (e.g., a laptop or other device).

The copy of the information sent to the connection software 114 is then passed to the normalization and indexing software 112 for reformatting before being stored in the storage/database 106 and becoming accessible to the analyst dashboard 132.

Similarly, the process functions in reverse where messages sent from device1 122 are relayed by the messaging platform server both to the destination 3rd party device 160 and the connection software 114. Messages originating from the connection software 114 are relayed in a similar fashion to the 3rd party device 160 and device1 122. This process is virtually identical for most messaging platforms.

Example of an application of the system. In one application, a child protection agent obtains a warrant and breaches the security of a mobile device of a known criminal using an existing phone cracking tool. The agent then connects the system 100 to messaging accounts associated with the mobile device. The system then logs all activity in public groups, private groups, one-on-one chats, or other similar information that the account is connected to. The original phone is placed in evidence. If there is a need, the agent is able to communicate as the original criminal via the connected accounts (i.e., an online account takeover).

In another use case, an analyst connects several accounts of undercover agents or sources to the system 100. Text and messages, sent images, and video obtained through source accounts are monitored to obtain new evidence and leads. In addition, all information obtained from the source account can be used to improve source safety. For example, some platforms make available location information, which can be extracted by the system and used to locate agents in need of help.

In yet another use case, an agent creates a new account on a messaging platform, joins that account to the system 100 and then enters forums or private groups where illegal activity may be taking place. All information in those forums is then automatically recorded by the system 100.

In still another use case, an agent may be interviewing a known offender who may be able to supply useful information. If the offender agrees to collaborate, the agent can request that their mobile device be connected to the system 100. Because the system can be connected very quickly, the collaboration agreement can be "locked in" immediately, with the sending of a single text, thus eliminating the problem of sources backing out or having second thoughts.

In another use case, large numbers of connected accounts may generate an "information feed" on a topic area of interest to analysts. For example, the system 100 could connect to many different blogger accounts reporting on a subject (e.g., events occurring in an area of interest) via Telegram® and the resulting information feed could save analysts the work of having to analyze, identify and join each account individually.

In yet another use case, witness information can be extracted remotely via a remote confirmation, allowing the witness to securely pass information onwards without having to surrender their mobile device.

The approach embodied in the described system could saves agents many man hours compared with the previous methods. In addition, the system 100 can provide for very reliable capture of all evidence, including disappearing messaging as well as the benefits for source safety.

This is a new approach to the problem of legal intercept in encrypted networks. The growth of encrypted networks has been dramatic, for example Telegram® had 200 million users, in 2020, 500 million users in 2021 and over 700 million users by the end of 2022. Hence the problem itself is new. The major companies in the field work on "cracking encryption", which is problematic because it puts them in direct confrontation with phone manufacturers and always is at risk of being patched out as phone companies release security updates. By contrast, the multiple device connection feature is a feature which is used by millions of users, and message platform companies cannot easily remove it. By adopting a consensual approach and making use of this multiple device connection feature to facilitate scalable connection, a new method of collecting data is available where one has consensual access to the mobile device.

While the present disclosure has been described with reference to one or more exemplary embodiments, it will be understood by those skilled in the art that various changes may be made and equivalents may be substituted for elements thereof without departing from the scope of the present disclosure. In addition, many modifications may be made to adapt a particular situation or material to the teachings of the disclosure without departing from the scope thereof. Therefore, it is intended that the present disclosure not be limited to the particular embodiment(s) disclosed as the best mode contemplated, but that the disclosure will include all embodiments falling within the scope of the appended claims.

What is claimed is:

1. A system for managing information transmitted to one or more devices and automatically normalizing data received from a plurality of messaging platforms, the system comprising:

an intercept server having a storage and having software executing thereon including:
a normalization and indexing module;
a connection module;
a dashboard module;
said intercept server coupled to an analyst computer via a network connection;
said intercept server coupled to a messaging platform server via the network connection, the messaging platform server using a messaging platform data format for communicating data;
wherein, when the data is transmitted from the messaging platform server to the one or more devices, the data is also transmitted to said intercept server;
said connection module receiving the data transmitted from the messaging platform server in the messaging platform data format;
said normalization and indexing module automatically identifying the received data and modifying the received data to be in a system data format, which is saved on the storage, wherein the system data format is different than the messaging platform data format;
said dashboard module receiving a request from the analyst computer to access the saved data;
said intercept computer transmitting the saved data to the analyst computer;
wherein system data is transmitted from said intercept server via said connection module to the messaging platform server, and
wherein the system data is automatically modified by said normalization and indexing module to be in the messaging platform data format prior to the system data being transmitted to the messaging platform server.

2. The system according to claim 1, wherein the one or more devices are associated with an account with the messaging platform server and the data transmitted from the messaging platform server to the one or more devices will remain on the one or more devices for a set time period after which the data transmitted from the messaging platform server to the one or more devices is automatically deleted from the one or more devices.

3. The system according to claim 2, wherein the received data is selected from a group consisting of: text, audio files, image files, video files, account contacts, usernames, groups that the account has joined or activity times for the account.

4. The system according to claim 2, wherein said connection module supplies account details to the messaging platform server including a phone number associated with the one or more devices and a receiving device identifier (ID).

5. The system according to claim 4, wherein authorization keys are exchanged between the messaging platform server and the connection module to enable end to end encrypted communication.

6. The system according to claim 1, wherein the one or more devices comprise a first device and a second device, where the first device is associated with a first account with the messaging platform server and the second device is associated with a second account with the messaging platform server.

7. The system according to claim 6, further comprising, a third device associated with the first account; and a fourth device associated with the second account.

8. The system according to claim 1, wherein the storage further comprises a look-up table, and said normalization and indexing module utilizes the look-up table to identify and modify the received data or modifies the received data with an additional column that labels the messaging platform server.

9. The system according to claim 1, wherein when the data is transmitted from the one or more devices to the messaging platform server, the data is simultaneously transmitted to said intercept server.

10. The system according to claim 1, wherein when the system data is transmitted from said intercept server, the system data is transmitted simultaneously to both the one or more devices and the messaging platform server.

11. The system according to claim 1, wherein the messaging platform server comprises a first messaging platform server, the messaging platform data format comprises a first data format, the data comprises first data, and said one or more devices comprise a first device and a second device, the first data transmitted to the first device, wherein, said intercept server coupled to a second messaging platform server via the network connection, the second messaging platform server using a second data format for communicating second data, wherein the system data format is different than the second data format;

wherein, when the second data is transmitted from the second messaging platform server to the second device, the second data is simultaneously transmitted to said intercept server;

said connection module receiving the second data from the second messaging platform server and saving the second data on the storage;

said normalization and indexing module identifying the received second data and modifying the received second data to be in the system data format, which is saved on the storage;

said dashboard module receiving a request from the analyst computer to access the saved second data;

said intercept computer transmitting the saved second data to the analyst computer.

12. The system according to claim 11, wherein the system data comprises first system data, wherein second system data is transmitted from said intercept server via said connection module to the second messaging platform server; and wherein the second system data is automatically modified by said normalization and indexing module to be in the second data format prior to the second system data being transmitted to the second messaging platform server.

13. The system according to claim 12, wherein the first device and the second device are associated with a first account with the first messaging platform server and a second account with the second messaging platform server respectively.

14. The system according to claim 13, further comprising:

a third device associated with the first account; and a fourth device associated with the second account.

15. The system according to claim 13, wherein the received first and second data are each selected from a group consisting of: text, audio files, image files, video files, account contacts, usernames, groups the account has joined or activity times for the first and second accounts respectively.

16. The system according to claim 13, wherein said connection module supplies account details for the first and second accounts respectively to the messaging platform server including a phone number and a receiving device identifier (ID) associated with respective first or second devices.

17. The system according to claim 11, wherein the storage further comprises a look-up table, and said normalization and indexing module utilizes the look-up table to identify and modify the first and second received data respectively or modifies the first and second received data respectively with an additional column that labels the first or second message platform server respectively.

18. The system according to claim 12, wherein the first data transmitted to the first device will remain on the first device for a set time period after which the first data is automatically deleted from the first device.

19. The system according to claim 11, wherein when the first or the second data is transmitted from either the first or second device to the first or second messaging platform servers respectively, the first or the second data is simultaneously transmitted to said intercept server.

20. The system according to claim 11, wherein when the system data or second system data is transmitted from said intercept server, the system data or second system data is simultaneously transmitted to the first or second devices respectively.

* * * * *